Patented Sept. 22, 1942

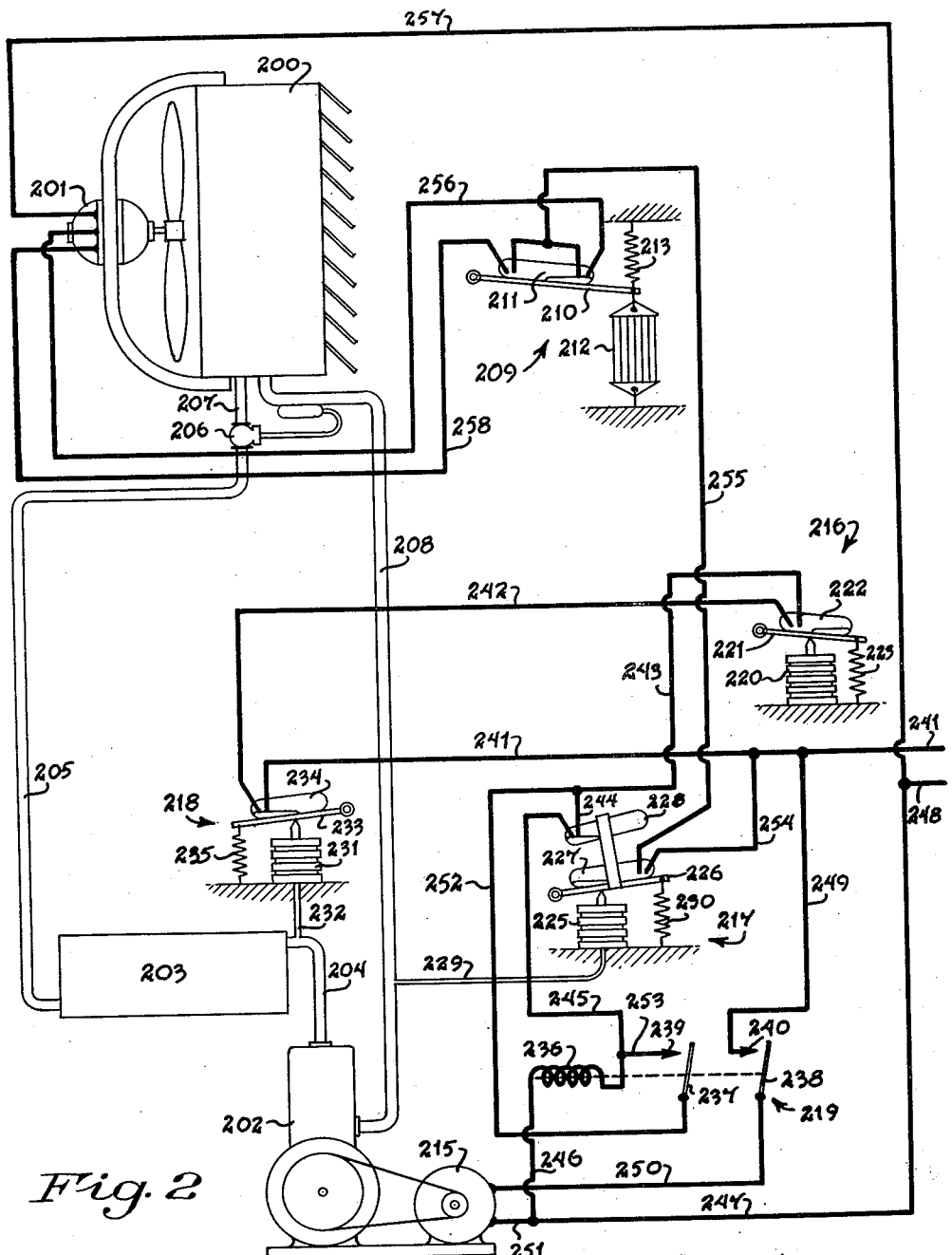

2,296,530

UNITED STATES PATENT OFFICE 2,296,530

AIR CONDITIONING SYSTEM

William L. McGrath, St. Paul, Minn., assignor to Minneapolis-Honeywell Regulator Company, Minneapolis, Minn., a corporation of Delaware Application July 16, 1937, Serial No. 154,028

9 Claims. (Cl. 62—6)

This invention relates to air conditioning and is more particularly concerned with the control of cooling and dehumidification of air.

The primary object of my invention is to provide a simple and effective air conditioning system which acts automatically to maintain the temperature of a conditioned space at a desired value and which acts also to shift its efforts as between sensible heat cooling and dehumidification in a manner to maintain the humidity of the conditioned air within desired limits.

When air is passed over a cooling coil or through a spray of chilled liquid, both a cooling action and a dehumidifying action will occur if the temperature of the cooling device is below the dew-point temperature of the air. With this condition of the cooling coil or device, the sensible heat of the air contacting the chilled cooling surface is reduced, and also a portion of the latent heat of evaporation of the water vapor in the air which contacts the chilled cooling surface is removed, this resulting in condensation of a portion of the water vapor thereby reducing the moisture content of the air being conditioned as well as reducing its temperature. The amount of cooling and dehumidification done by a cooling coil will vary with the temperature of the coil, and also with the velocity of the air flowing across such coil. When the temperature of a cooling coil is reduced, the temperature difference between the air being cooled and the cooling surface will be increased, this causing an increase in sensible heat removal of the coil. Also, when the coil temperature is reduced, an increased amount of water vapor will be condensed upon the cooling surface, and this increase in dehumidification will be greater in proportion to the accompanying increase in sensible heat cooling. A variation in temperature of the cooling surface will therefore vary the amount of cooling and dehumidification obtained, and will also vary the relationship between the amount of cooling done and the amount of dehumidification done.

A variation in air velocity across the cooling surface will also vary the proportion of cooling to dehumidification done by the cooling coil. If the air velocity across the cooling coil is reduced, the air remains in contact with the cooling surface for a longer period of time, this causing its temperature to be decreased which decreases the temperature difference between the cooling surface and the air being conditioned, which results in the cooling action of the coil being decreased. At this time, however, the dehumidifying action of the coil will not be correspondingly decreased due to the air remaining in contact with the cooling coil for a longer period of time, which permits a greater proportion of the water vapor in the air to be condensed. Also, when the air velocity is reduced, the resulting decrease in cooling load results in decreasing the load on the compressor, which causes the cooling coil temperature to be lowered, thereby increasing its dehumidifying action. Hence, variation of the air velocity over the cooling coil will also vary the relationship between the amount of cooling done and the amount of dehumidification done.

It is an object of my invention to provide for obtaining proper temperature and humidity conditions within a conditioned space by varying the velocity of the air flow across a cooling coil and the temperature of the cooling coil in accordance with variations in the temperature and humidity conditions prevailing within the conditioned space.

In accordance with one form of my invention, the rate of air flow across a cooling coil is varied in accordance with variations in moisture content of the air being conditioned, and the operation of the refrigeration system for the cooling coil is controlled in accordance with variations in temperature within the conditioned space. By this arrangement, when the humidity within the conditioned space becomes excessive, the air flow across the cooling coil is decreased which results in appreciably decreasing the sensible heat removed by the coil, while decreasing the dehumidification done only slightly. This decrease in sensible heat cooling will result in slightly increasing the temperature within the conditioned space. In response to such slight increase in temperature, the cooling coil temperature is reduced, thereby increasing the dehumidifying effect of the coil for overcoming the excessive humidity condition and also increasing the cooling effect of the coil for preventing rise in space temperature. It is therefore a further object of my invention to provide an air conditioning control system having the sequence above described.

Another object of my invention is the provision of an automatic control system which is especially adapted for air conditioning systems of the unit cooler type.

A further object of my invention is to provide a novel control arrangement which is adapted for cooling systems of the zoned type in which individual cooling units are provided for different zones.

Other objects of my invention will appear from the following detailed description and from the appended claims.

For a full disclosure of my invention, reference is made to the following description and the accompanying drawings, in which—

Figure 1 shows diagrammatically one form of my invention, and in which

Figure 2 is a diagrammatic illustration of a modification.

Figure 1:
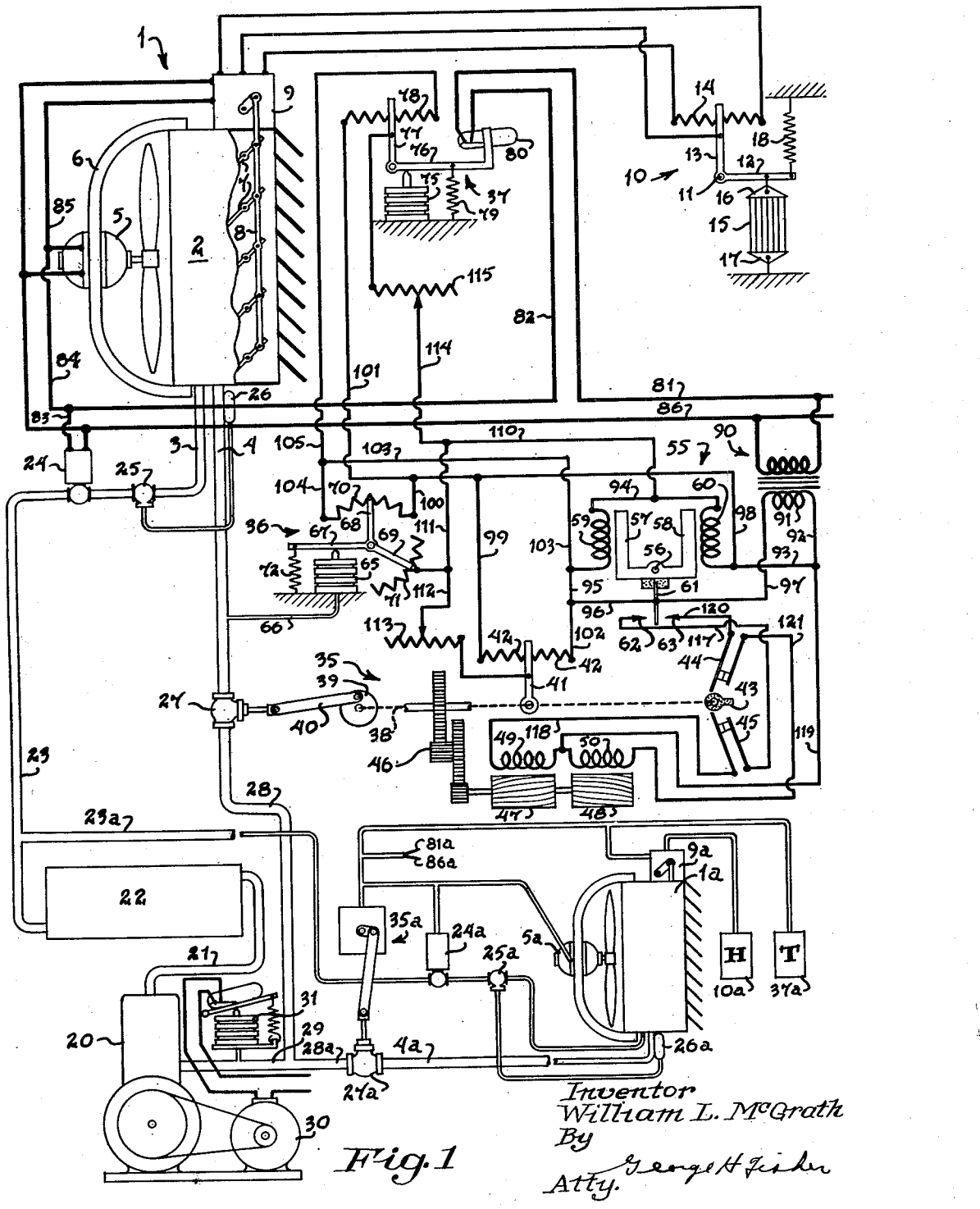

Referring to Figure 1, reference character 1 indicates generally an air conditioner which may be of the unit type. This conditioner comprises a direct expansion air fin type of cooling coil (not shown), which is located within a casing 2. The cooling coil is provided with a refrigerant inlet 3 and a refrigerant outlet or suction line 4. A fan 5 for forcing air across the cooling coil is provided, this fan being secured to the casing 2 by means of bracket 6. For graduatingly controlling the flow of air across the cooling coil, a damper mechanism is provided comprising a plurality of rotatable blades 7 which are connected together by an operating member 8 which is actuated by a proportioning motor 9. Proportioning motor 9 may be of any desired type and preferably is of the type shown and described in Patent No. 2,028,110 issued on Jan. 14, 1936, to Daniel G. Taylor. This type of proportioning motor is arranged to be controlled by means of a potentiometer type of controller, the operating arm of the motor assuming angular positions corresponding to the position of a potentiometer slider upon its resistance. In accordance with my invention, the proportioning motor 9 is controlled by means of a humidity controller 10.

Humidity controller 10 may be of any suitable form and is shown herein as comprising a pivoted bell-crank lever 11 having an actuating arm 12 and a control arm 13 which cooperates with a resistance 14 to form a control potentiometer for the proportioning motor 9. Connected to actuating arm 12 is a humidity responsive actuator consisting of a plurality of strands 15 of hair or other moisture responsive material, these strands being secured at their ends by clamping members 16 and 17. The clamping member 16 is secured to the actuating arm 12 while member 17 is fixedly secured. A spring 18 urges arm 12 upwardly to maintain the strands 15 taut. Upon an increase in humidity the strands 15 will increase in length, this causing arm 13 to shift to the left across resistance 14 under the action of spring 18. The proportioning motor 9 will follow up this movement of control arm 13 in a direction for closing the damper blades 7. Conversely, upon a decrease in relative humidity the strands 15 will shrink, this causing movement of the control arm 13 to the right across resistance 14, this causing movement of the proportioning motor 9 in a direction for opening damper blades 7 and increasing the flow of air across the cooling coil. By the arrangement described, therefore, the air flow across the cooling coil is progressively increased as the humidity decreases and is progressively decreased as the humidity increases.

The cooling coil in the unit conditioner 1 may form a part of a compression refrigeration system, such system including a compressor 20 connected by a discharge pipe 21 to a condenser 22, this condenser in turn being connected by pipe 23 to the inlet of a solenoid valve 24. The outlet of solenoid valve 24 is connected to an expansion valve 25 which in turn is connected to the inlet 3 of the cooling coil. Expansion valve 25 may be of any suitable form and is shown herein as being of the thermostatic type having a control bulb 26 attached to the outlet pipe 4 of the cooling coil. The said outlet 4 is shown connected to the inlet of a valve 27 and the outlet of this valve is connected by pipes 28 and 29 to the suction side of the compressor 20. The compressor 20 may be driven by means of an electric motor 30 which is controlled by means of a suction pressure controller 31 located at the compressor inlet. This controller 31 may be of known form and operates to start the compressor when the suction pressure increases to a predetermined value and to stop the compressor when the suction pressure is lowered to a predetermined lower value.

The valve 27 is controlled by means of a proportioning motor generally indicated as 35, which may be of the type shown and described in the Taylor patent. This proportioning motor is controlled primarily by a suction pressure controller 36 and the operation of this suction pressure controller is modified by means of a temperature controller 37 which may be located within the conditioned space.

Proportioning motor 35 may comprise a main operating shaft 38 having mounted thereon an operating member 39 which is secured to the valve 27 by means of a link 40. Also operated by shaft 38 is a balancing arm 41 which cooperates with a resistance 42 to form a balancing potentiometer, the purpose of which will become apparent. A limit switch actuating member 43 may be also operated by shaft 38 and is arranged to open the limit switches 44 or 45 whenever the shaft 38 is rotated to a limit of rotation. The shaft 38 is driven through a gear train 46 by means of a reversible electric motor which may include armatures 47 and 48 cooperating with field coils 49 and 50 respectively. It will be understood that armature 47 and field coil 49 form a motor for driving shaft 38 in one direction, and that armature 48 and field coil 50 comprise a motor for driving shaft 38 in the opposite direction.

Energization of field coils 49 and 50 is controlled by means of a balancing relay 55. Relay 55 may include a U-shaped armature pivoted at 56 and having legs 57 and 58 cooperating with relay coils 59 and 60 respectively. The armature carries by means of an insulating connection a switch arm 61 adapted for engagement with contacts 62 and 63. When coils 59 and 60 are equally energized, the upward pull on legs 57 and 58 will be equal, this causing the armature to assume a mid position in which switch arm 61 is disengaged from contacts 62 and 63. If, however, the current flow in relay coil 59 is greater than the current flow in relay coil 60, the switch arm 61 will engage contact 62. Conversely, if more current flows through coil 60 than through coil 59, the switch arm 61 will engage contact 63.

Energization of relay coils 59 and 60 is controlled by means of the suction pressure controller 36 and the temperature controller 37. Referring now to the pressure controller 36, this controller may comprise a bellows 65 which is fixedly secured at its lower end and the interior of which is connected to outlet pipe 4 by a tube 66. The bellows 65 cooperates with an actuating arm 67 which actuates a control arm 68 and a corrector arm 69, the control arm 68 cooperating with the control resistance 70 to form a control potentiometer, and the corrector arm 69 cooperating with a center tapped corrector resistance 71. Upon an increase in suction pressure, the bellows 65 will expand against the action of spring 72, causing clockwise movement of the arms 68 and 69 across their respective resistances. Upon a decrease in suction pressure, however, the bellows 65 will contract under the action of spring 72, this causing movement of arms 68 and 69 in the opposite direction.

The temperature controller 37 may take any suitable form and is here illustrated as comprising a bellows 75 which is arranged to operate an actuating arm 76 for rotating a control arm 77 which together with a resistance 78 forms a control potentiometer. A spring 79 urges the arm 76 against the bellows 75. The bellows 75 contains a suitable volatile fluid which causes the pressure within the bellows to increase upon an increase in space temperature, this causing expansion of the bellows for shifting control arm 77 to the left across control resistance 78. Upon a decrease in space temperature, the vapor pressure of the volatile fill will decrease, this causing the bellows 75 to contract under the action of spring 79, this causing movement of control arm 77 to the right across resistance 78.

The actuating arm 76 of the controller 37 is shown as carrying a mercury switch 80. This mercury switch is arranged so that it breaks its circuit whenever the room temperature falls to such a value that the control arm 77 engages the extreme right end of control resistance 78. This value of temperature may be, for instance, 75° F. When the space temperature increases, however, so that control arm 77 is shifted from the extreme right end of resistance 78, the mercury switch 80 will be tilted for closing its circuit.

One terminal of mercury switch 80 is connected to line wire 81 while the other terminal is connected to a wire 82 which is in turn connected to the solenoid valve 24, to the fan motor 5 and to the proportioning motor 9 by means of wires 83, 84 and 85. The other terminals of the motors and valve are connected, as shown, to a second line wire 86. By this arrangement, when the space temperature falls below 75° F. the supply of power to the solenoid valve, to the fan motor, and to the proportioning motor, will be broken, this causing the solenoid valve 24 to close and the fan motor 5 to stop. When the temperature rises above the set value, such as 75° F., the mercury switch 80 will close, thereby energizing the solenoid valve 24 to cause it to open. Closing of mercury switch 80 will also place the fan in operation and supply power to the proportioning motor 9.

Reference character 90 indicates a step-down transformer, the primary of which may be connected to line wires 81 and 86. The low voltage secondary 91 of transformer 90 supplies power to the proportioning motor system. Relay coils 59 and 60 are connected across the terminals of secondary 91 by means of wires 92, 93, 94, 95, 96 and 97. Attached to wire 93 is a wire 98, this wire in turn being connected to the left end of balancing resistance 42 by wire 99, to the right end of control resistance 70 by wire 100, and to the left end of control resistance 78 by wire 101. The wire 95 is connected to the right end of resistance 42 by wire 102 and is also connected to a wire 103 which in turn is connected to resistances 70 and 78 by wires 104 and 105. By the wiring arrangement just described, it will be apparent that each of the control resistances and the balancing resistance are connected in parallel across the terminals of the transformer secondary 91 along with the relay coils 59 and 60 which are connected across said transformer secondary in series. A flow of current will therefore take place through each of the resistances and through the relay coils. To the wire 94 which joins the upper ends of the relay coils 59 and 60 is connected a wire 110, this wire being connected to corrector resistance 71 by means of wire 111 and to the balancing arm 41 by wire 112, a rheostat 113 being interposed in this connection. The wire 110 is also connected to the control arm 77 of controller 37 by means of a wire 114, having interposed therein a rheostat 115. By this arrangement, each of the control arms and the balancing arm are connected to the upper ends of relay coils 59 and 60. This has the effect of causing the control arms and balancing arm to divide their respective resistances each into one portion which is connected in parallel with relay coil 59 and into another portion which is in parallel with relay coil 60. Movement of either of the control arms or of the corrector arm will therefore vary the amount of resistance in parallel with the relay coils and will thereby vary the relationship between the current flow in each coil.

With the parts in the position shown, each of the control arms are engaging the center of their respective resistances and for this position of the controllers the motor has assumed a position in which the balancing arm 41 engages the mid portion of balancing resistance 42, the valve 40 for this position of the motor being half open. As the amount of resistance in parallel with relay coil 59 is now equal to the resistance in parallel with coil 60, the current flow in said relay coils will be equalized, this causing the switch arm 61 to disengage contacts 62 and 63 as shown. If now should the pressure of the refrigerant in outlet pipe 4 increase, the control arm 68 will be shifted to the right across control resistance 70, this decreasing the portion of said resistance which is in parallel with relay coil 60 and increasing the portion of said resistance which is in parallel with relay coil 59. This will cause an increase in current flow in coil 59 and a decrease in current flow in coil 60, thereby causing switch arm 61 to engage contact 62, which energizes motor field 49 by a circuit as follows: transformer secondary 91, wire 97, switch arm 61, contact 62, wire 117, limit switch 45, wire 118, motor field 49, wire 119 and wire 92 to secondary 91. Energization of motor field 50 will cause clockwise rotation of shaft 38 which causes opening movement of valve 27. At the same time that valve 27 is being thus opened, the balancing arm 41 will be shifted to the right across resistance 42, this decreasing the portion of said resistance which is in parallel with relay coil 59 and increasing the portion of said resistance which is in parallel with relay coil 60. This will increase the current flow in coil 60 and decrease the current flow in coil 59, thereby tending to balance out the initial unbalancing action caused by controller 36. When shaft 38 is rotated to such an extent that the balancing potentiometer rebalances the current flow in relay coils 59 and 60, the switch arm 61 will disengage contact 62 thereby deenergizing motor field 50 which causes the motor to stop with the valve in this further opened position.

Upon a decrease in pressure in outlet pipe 4, the opposite action will take place, namely, control arm 68 will shift to the left across resistance 70, this causing an increase in current flow in relay coil 60 and a decrease in current flow in coil 59, thereby causing engagement of switch arm 61 with contact 63 which energizes motor field 50 for driving the valve towards closed position. While the valve is being driven towards closed position, the balancing potentiometer will gradually balance out the initial unbalancing action and will cause stopping of the motor when the valve has been closed an amount corresponding to the movement of control arm 68 on resistance 70. By the arrangement just described, therefore, the valve 27 is progressively opened as the refrigerant pressure increases, and is progressively closed as the refrigerant pressure decreases.

The purpose of the rheostat 113 which is interposed in the wire 112 leading to the balancing arm 41 is to desensitize the balancing potentiometer to thereby decrease the operating range of the pressure controller 36. This rheostat acts to restrict the current flow through the balancing arm and thus cause an increased movement of the balancing arm to be required for effecting a given change in energization of relay coils 59 and 60. By this arrangement a relatively small movement of control arm 68 on control resistance 70 will cause such an unbalancing action that movement of the balancing arm from one extreme to the other is required for rebalancing. By adjusting rheostat 113, a desired partial movement of control arm 68 within its range of movement may cause movement of the valve 27 from one extreme position to the other.

If the space temperature should increase, the control arm 77 of the controller 37 will be shifted to the left across resistance 78, thus decreasing the portion of said resistance which is in parallel with relay coil 60 and increasing the portion of said resistance which is in parallel with relay coil 59. This will result in relay coil 59 becoming more highly energized than relay coil 60, thereby causing switch arm 61 to engage contact 62 for operating the motor in a direction to open valve 27. The balancing potentiometer during this movement will operate to balance out the intitial unbalancing action of controller 37 on the relay 55 and when the movement of the valve corresponds to the movement of control arm 77 on resistance 78, the relay will become rebalanced thereby causing the motor to stop with the valve in this new position. An increase in space temperature will therefore act to cause opening movement of the valve 27. In a similar manner, a decrease in space temperature will cause corresponding movement of valve 27 towards closed position.

The purpose of the controller 37 is to adjust the suction pressure controller 36 to cause said suction pressure controller to maintain a lower refrigerant pressure in the cooling coil as the space temperature increases. Thus upon an increase in space temperature the valve 27 will be opened in the manner just described. This will permit an increased amount of refrigerant to flow to the compressor, thereby causing a fall in pressure within the pipe 4. As this pressure decreases due to opening of the valve, the pressure controller 36 will act in conjunction with the balancing resistance 42 to limit the opening movement of the valve. In this manner, an increase in space temperature causes the controller 36 to maintain a lower refrigerant pressure and hence a power coil temperature. In a similar manner, upon a decrease in space temperature, the relay 55 is unbalanced in a direction for causing closing movement of valve 27, this closing movement resulting in an increase in pressure in outlet pipe 4. The controller 36 in response to this increase in pressure will operate in conjunction with the balancing potentiometer to rebalance the relay. Before the relay is rebalanced, however, the refrigerant pressure must be increased and therefore a decrease in space temperature causes the controller 36 to maintain a higher refrigerant pressure within the cooling coil. The controller 37 therefore acts to adjust the pressure controller 36 in a manner to cause higher refrigerant pressures to be maintained as the space temperature decreases, and for causing lower refrigerant pressures to be maintained within the cooling coil as the space temperature increases.

It will be noted that rheostat 115 is interposed between the temperature controller 37 and the relay 55. This rheostat restricts the current flow through control arm 77 and thereby varies the effect upon relay coils 59 and 60 of a given movement of said control arm. By adjusting this rheostat the effect of the controller 37 upon the control point of pressure controller 36 may be varied so as to secure the desired decrease in suction pressure for a given increase in space temperature.

By controlling the flow of refrigerant from the cooling coil by means of valve 27, an arrangement is provided which is especially adapted for zone control. By this arrangement, as many conditioners as desired may be operated from a single compressor and condenser unit. Thus, if desired additional conditioning units, such as 1a, may be connected to the compressor 20. As shown, a branch pipe 23a may lead from the outlet of condenser 22 to a solenoid valve 24a which corresponds to valve 24 of conditioning unit 1. The conditioning unit 1a may be identical with the conditioning unit 1, having a fan 5a and a proportioning motor 9a for controlling the flow of air through the cooling coil, the proportioning motor being controlled by means of a humidity controller 10a. A valve 27a corresponding to the valve 27 may be connected to the refrigerant outlet pipe 4a leading from the cooling coil of conditioner 1a. This valve may be actuated by a proportioning motor 35a which is controlled by a temperature controller 37a, or which may be controlled in the same manner as the valve 27. It will be apparent that as many conditioning units as desired may be connected to the compressor 20.

*Operation of Figure 1*

When the space temperature is below a predetermined value, such as 75° F., the control arm 77 of the temperature controller 37 will engage the extreme right-hand end of resistance 78 and the mercury switch 80 will be tilted to open position. Now if the temperature increases above the desired value, for instance 75° F., the control arm 77 will be shifted from its extreme position, this causing closing of mercury switch 80 for opening the solenoid valve 24 and for energizing the fan motor, this closing of switch 80 also supplying power to the proportioning motor 9. Refrigerant will then enter the cooling coil, and due to the air being blown across such coil, the refrigerant will evaporate to cause cooling of the air. This evaporation of the refrigerant will cause the pressure within the cooling coil to increase and in response to this increase in pressure, the pressure controller 36 will cause opening of valve 27 to permit flow of refrigerant to the compressor. The pressure at the suction side of the compressor will then begin increasing, and controller 31 will place the compressor in operation when this refrigerant pressure rises to a predetermined value. The pressure controller 36 will operate to control the valve 27 in a manner to maintain a refrigerant pressure within the cooling coil as determined by the controller 37. If the space temperature should increase, the controller 37 will reset the pressure controller 36 in a manner to cause said controller to maintain a lower refrigerant pressure. This will result in the temperature of the cooling coil being lowered for increasing the cooling effect in a manner to counteract further increase in space temperature. Meanwhile, it will be understood that humidity controller 10 is controlling the flow of air across the cooling coil. If the relative humidity should increase, the controller 10 will cause a reduction in air flow across the cooling coil. This reduction in air flow will reduce the cooling action without corresponding reduction in the dehumidifying action of the coil. This decrease in the cooling effect of the cooling coil caused by reduction in air flow thereacross will eventually result in the space temperature increasing, and in response to this increase in space temperature, the controller 37 will cause the cooling coil temperature to be decreased in the manner previously described. This decrease in cooling coil temperature will increase its dehumidifying action to thereby counteract the increase in relative humidity, and the increase in space temperature.

It will be apparent that upon falling relative humidity, the opposite action will take place, namely, the humidity controller 10 will cause an increase in air flow across the cooling coil, which results in increasing the cooling effect of said coil, this in turn resulting in reducing the space temperature. In response to this reduction in space temperature, the controller 37 will reset the pressure controller 36 for maintaining a higher suction pressure, and hence a higher coil temperature. This increase in coil temperature will decrease the dehumidifying action of the coil, thereby counteracting the tendency of the relative humidity to fall. As the space temperature continues to decrease, the cooling coil temperature will be progressively increased by the controller 37, thereby reducing the cooling action of the cooling coil to counteract the fall in temperature. When the cooling load becomes so light that the temperature falls to the predetermined minimum, the mercury switch 80 will break, which causes stopping of the fan and closing of the solenoid valve. Closing of the solenoid valve will prevent refrigerant from entering the cooling coil and hence the pressure within such coil will decrease, and in response to this decrease in pressure, the controller 36 will cause closing of the outlet valve 27. Therefore, when the temperature in the space in which the conditioner is located falls to a value indicating that further cooling is unnecessary, the conditioner is completely placed out of operation.

It will be apparent that the pressure controller 31 will stop and start the compressor 70 in a manner to maintain the pressure of the refrigerant entering the compressor between predetermined limits. This will automatically cause the compressor to be operated in accordance with the amount of refrigerant being evaporated, and hence will control the compressor in a manner to carry the prevailing load regardless of the number of conditioners in operation and of the load upon each conditioner. When all of the conditioners are out of operation, no refrigerant will be passed from any of the cooling coils to the compressor inlet, and hence the suction pressure will fall, causing the compressor to be placed out of operation, and the compressor will remain out of operation until the flow of refrigerant thereto is restored by operation of one of the conditioning units.

*Figure 2*

Referring now to Figure 2, I have shown a modified form of my invention in which the change in air flow across the cooling coil is effected by varying the fan speed, and in which the temperature of the cooling coil is controlled by varying the operation of the compressor. Reference character 200 indicates a unit cooler of any suitable form, this cooler including a fan 201. The unit cooler 200 is actuated by a condensing unit consisting of a compressor 202 and a condenser 203. The discharge of the compressor 202 is connected to the inlet of the condenser 203 by a conduit 204, while the outlet of the condenser is connected by a liquid line 205 to an expansion valve 206, this expansion valve in turn being connected to the inlet of the cooling coil within cooler 200 by means of a conduit 207. The outlet of the cooling coil is in turn connected to the suction side of the compressor 202 by means of a suction line 208.

The fan 201 is of the multi-speed type and is shown herein as being adapted for operation at a high speed and at a low speed. The speed of this fan is controlled by means of a humidity controller 209. This humidity controller may take any desired form, and is diagrammatically illustrated herein as comprising a pivoted mercury switch carrier 210 upon which is mounted a mercury switch 211. The free end of the carrier 210 is shown connected to a humidity responsive device comprising a plurality of strands 212 of hair or other moisture responsive material, a spring 213 being provided for maintaining the strands taut. Upon an increase in relative humidity, the strands will increase in length, this causing the spring 213 to rotate the switch carrier and mercury switch in a counter-clockwise direction. Upon decreasing relative humidity, however, these strands will decrease in length, this causing rotation of the mercury switch in the opposite direction. This instrument may be so designed and adjusted that when the relative humidity is below 50% the mercury switch will be tilted as shown, this causing making of the right-hand contacts thereof. When the relative humidity exceeds 60%, however, the strands 212 will extend sufficiently to cause tilting of mercury switch 211 for closing the left-hand contacts thereof. The mercury switch 211 controls the speed of the fan 201 and is so connected that when the relative humidity is low, the fan operates at high speed, and when the relative humidity is high, the fan operates at low speed.

The compressor 202 may be driven by means of an electric motor 215 and this motor may be controlled by means of a space temperature controller 216, a suction pressure controller 217, and a high pressure cutout 218, these controllers controlling the compressor motor 215 through a relay 219.

The space temperature controller 216 may be of any suitable form and is here shown diagrammatically as comprising a bellows 220, this bellows actuating a pivoted mercury switch carrier 221 upon which is mounted a mercury switch 222. The bellows 220 contains a suitable volatile fluid and hence the pressure within said bellows varies in accordance with the temperature to which it is subjected. Upon an increase in space temperature this bellows will expand against the action of a spring 223, this tilting mercury switch 222 towards closed position. Upon a decrease in temperature the opposite action will take place, namely, the bellows will contract thereby permitting tilting of mercury switch 222 towards open position. This instrument may be so designed and adjusted as to cause closing of the mercury switch 222 whenever the space temperature exceeds the desired value, for instance 75° F.

The suction pressure controller 217 may be of any desired form and is shown herein as comprising a bellows 225 arranged for actuating a pivoted mercury switch carrier 226 which carries mercury switches 227 and 228. The mercury switches 227 and 228 are so arranged that upon clockwise rotation of carrier 226, the switch 227 will first make, and upon continued rotation of said switch carrier, the switch 227 will break. The bellows 225 is connected to the suction line 208 by means of a tube 229 and hence the pressure within the bellows 225 will be equal to the suction pressure of the refrigeration system. Upon an increase in suction pressure, the bellows 225 will expand against the action of a spring 230, this causing tilting of the mercury switches 227 and 228 in a counter-clockwise direction. Upon a decrease in suction pressure, the bellows 225 will contract, this causing tilting of mercury switches 227 and 228 in a clockwise direction. This instrument may be so designed and adjusted so that mercury switch 228 makes when the suction pressure rises to a point indicating that the cooling coil temperature is above 32° F., the mercury switch 227 breaking when the suction pressure has risen any desired amount above this value.

The high pressure cutout 218 may be of any desired type and is shown herein as comprising a bellows 231 which is connected to the compressor discharge line 204 by means of a tube 232. Bellows 231 cooperates with a pivoted mercury switch carrier 233 which carries a mercury switch 234. A spring 235 urges the carrier downwardly against the bellows and is adjusted so that as long as the compressor discharge pressure is below a predetermined value, the mercury switch 234 is held in closed position. When the compressor discharge pressure rises to a point indicating unsatisfactory condenser operation, the bellows 231 will expand sufficiently against the action of spring 235 as to cause tilting of switch 234 to open position.

The relay 219 may be of any desired type, and may comprise a relay coil 236 which actuates a suitable armature (not shown), which armature in turn actuates a pair of switch arms 237 and 238 which cooperates with contacts 239 and 240 respectively. When relay coil 236 is energized, the switch arms 237 and 238 are brought into engagement with their respective contacts. When coil 236 is deenergized, the switch arms 237 and 238 will be pulled by means of gravity or springs, away from their cooperating contacts.

*Operation of Figure 2*

With the parts in the position shown, the relative humidity is below 60% as indicated by the mercury switch 211 being tilted so that its right-hand contacts are made. Also the space temperature is below 75° F. as indicated by mercury switch 222 of controller 216 being tilted to open position. The suction pressure is also above the defrosting value as indicated by the mercury switch 228 of the suction pressure controller 217 being tilted to closed position. In fact, the suction pressure is considerably above this defrosting value, as shown by the mercury switch 227 being in open position. For this position of the controllers 216 and 217, both the compressor and fan are out of operation.

If now should the space temperature rise above 75° F., the mercury switch 222 will be closed, this completing a circuit through relay coil 236 as follows: line wire 241, mercury switch 234 of high pressure cutout 218, wire 242, mercury switch 222, wire 243, wire 244, mercury switch 228, wire 245, relay coil 236, wire 246 and wire 247 to line wire 248. Energization of relay coil 236 causes engagement of switch arms 237 and 238 with contacts 239 and 240. Engagement of switch arm 238 with contact 240 will energize the compressor motor 15 as follows: line wire 241, wire 249, contact 240, switch arm 238, wire 250, compressor motor 215, wire 251 and wire 247 to line wire 248. Engagement of switch arm 237 with contact 239 will shunt out the mercury switch 244 and hence the relay coil 236 will be energized independently of mercury switch 228 as follows: line wire 241, mercury switch 234, wire 242, mercury switch 222, wire 243, wire 252, switch arm 237, contact 239, wire 253, relay coil 236, wire 246 and wire 247 to line wire 248.

By the wiring arrangement just described, it will be apparent that the compressor cannot be started unless the suction pressure is high enough to cause mercury switch 228 to be closed, this value of suction pressure being above 32° F., or the melting point of ice. After the compressor is started, however, this mercury switch is shunted out and hence the compressor will run until the space temperature falls below the setting of the space temperature controller 216. By preventing the compressor from starting before the suction pressure rises, the cooling coil of the conditioner is allowed to rise in temperature so as to melt any frost which may collect thereon. This arrangement, therefore, provides for automatic defrosting of the cooling coil for each cycle of operation.

Operation of the compressor in the above manner will result in the suction pressure of the refrigeration system being lowered, this reduction in suction pressure first causing tilting of mercury switch 227 to closed position and later causing tilting of the mercury switch 228 to open position. Tilting of mercury switch 228 to open position will at this time have no effect, due to the shunt circuit through the switch arm 237 and contact 239. Closing of mercury switch 227, however, will cause energization of the fan motor 201 as follows: line wire 241, wire 254, mercury switch 227, wire 255, right-hand contacts of mercury switch 211, wire 256, high speed terminal of fan motor, and wire 257 to line wire 248. Operation of the fan will cause a flow of air from the conditioned space through the cooling unit, thereby tending to cause reduction in temperature within the conditioned space. This operation will continue until the space temperature falls below 75° F., at which time the mercury switch 222 of controller 216 will open, this causing deenergization of relay 236 for stopping of the compressor motor. Due to the stopping of the compressor motor, the suction pressure will begin to rise and eventually this rise in suction pressure will cause tilting of the mercury switch 228 to closed position, and later will cause tilting of mercury switch 227 to open position, which results in stopping of the fan.

In the event that the relative humidity exceeds a predetermined value, for instance 60%, the mercury switch 211 of the humidity controller 210 will be tilted so that the left-hand contacts thereof are closed, this causing operation of the fan at low speed by the following circuit: line wire 241, wire 254, mercury switch 227, wire 255, left-hand contacts of mercury switch 211, wire 256, low speed terminal of fan motor, and wire 257 to line wire 248. This lowering of the fan speed when the system is in operation will cause a reduction in air flow across the cooling coil, which results in substantially reducing the sensible heat cooling effect of said coil. Due to the reduction in air flow, however, the air will remain in contact with the cooling coil for a longer period of time, and also, the cooling coil temperature will be lowered thereby permitting condensation of a larger portion of the water vapor in the air passing over the coil. The reduction in the rate of air flow therefore will materially reduce the sensible heat removing effect of the cooling coil without substantially effecting the dehumidifying effect of said coil. Due to this reduction in the sensible heat removing effect of the cooling coil, it will be caused to operate for a longer period of time each cycle. Inasmuch as the dehumidifying effect of the coil is not correspondingly reduced, a greater amount of dehumidification will therefore be done. The variation of the rate of air flow across the cooling coil in accordance with changes of relative humidity, therefore, acts to maintain the relative humidity within predetermined limits.

From the foregoing it will be seen that I have provided novel air conditioning control arrangements for automatically maintaining the temperature and humidity conditions of a space being conditioned within predetermined limits. It will also be apparent that my invention is applicable to either a modulating or two-position type of control and may be employed for either single unit systems or multiple unit zone control systems. While I have shown and described my invention as applied to coolers of the unit type, it will be apparent that my invention is also applicable to systems in which the conditioning apparatus is located in a chamber removed from the conditioned space. Also, while I have shown face dampers and a variable speed fan for controlling the air flow across the cooling coil, it will be apparent that other arrangements may be utilized, such for instance as a by-pass damper. In addition, while I have shown my invention applied to systems employing direct expansion cooling coils, I do not limit myself thereto, as certain features of my invention are applicable to systems in which brine is circulated through a cooling device. It will be apparent that many other changes will be obvious to those skilled in the art, and therefore I desire to be limited only by the scope of the appended claims and the prior art.

I claim as my invention:

1. In an air conditioning system, in combination, an evaporator in heat exchange relationship with air to be conditioned, expansion valve means of the superheat responsive type controlling the admission of refrigerant to the evaporator, means for varying the flow of air in heat exchange relationship with said evaporator, humidity responsive means for controlling said air flow varying means, means for withdrawing gaseous refrigerant from said evaporator, a controller for varying the rate of withdrawal of gaseous refrigerant from said evaporator, means responsive to the condition of the refrigerant in said evaporator for controlling said controller in a manner to maintain such condition constant, and temperature responsive means for adjusting said condition responsive means to vary the evaporator temperature maintained in accordance with changes in temperature.

2. In a zoned air conditioning system, in combination, a plurality of evaporators in heat exchange relationship with air to be conditioned, common means for supplying liquid refrigerant to said evaporator and for withdrawing gaseous refrigerant therefrom, means for causing a flow of air in heat exchange relationship with each of said evaporators, means for varying said air flows, humidity responsive means for controlling respective air flow varying means, valve means at the outlets of said evaporators for restricting flow of gaseous refrigerant from each of said evaporators, and space temperature responsive means for controlling respective valve means in a manner to lower the evaporator temperatures upon increase in respective space temperatures.

3. In a zoned air conditioning system, in combination, a plurality of evaporators in heat exchange relationship with air to be conditioned, common means for supplying liquid refrigerant to said evaporators and for withdrawing gaseous refrigerant therefrom, fan means for causing a flow of air in heat exchange relationship with said evaporators, individual means for varying said air flows, humidity responsive means for controlling respective air flow varying means, individual valve means for controlling the flow of refrigerant into said evaporators, individual valve means for restricting the flow of gaseous refrigerant from said evaporators, and temperature responsive means for controlling both of said valve means and said fan means.

4. In a zoned air conditioning system, in combination, a plurality of evaporators in heat exchange relationship with air to be conditioned, common means for supplying liquid refrigerant to said evaporators and for withdrawing gaseous refrigerant therefrom, fan means for causing a flow of air in heat exchange relationship with said evaporators, individual valve means for controlling the flow of refrigerant into said evaporators, individual valve means for restricting the flow of gaseous refrigerant from said evaporators, and temperature responsive means for controlling both of said valve means and said fan means.

5. In an air conditioning system, in combination, a heat exchange device over which air is adapted to be passed for a conditioning action, means for causing a flow of air over said heat exchange device and into a space to be conditioned, means for supplying cooling fluid to said heat exchange device, a controller for varying the temperature of said heat exchange device, a reversible electric motor for actuating said controller, a thermostatic switching mechanism for operating said motor for decreasing the temperature of said heat exchange device upon rise in temperature and vice versa, said thermostatic switching mechanism acting to stop said motor in intermediate positions for thereby providing graduating control, damper means for varying the flow of air across said heat exchange device, an electric damper motor for positioning said damper means, and humidity responsive switching means for controlling said electric damper motor.

6. In an air conditioning system, in combination, a heat exchange device over which air is adapted to be passed for a conditioning action, means for causing a flow of air over said heat exchange device and into a space to be conditioned, means for supplying cooling fluid to said heat exchange device, a controller for varying the temperature of said heat exchange device, a reversible electric motor for actuating said controller, switching means operative to selectively cause movement of said motor in either direction or to cause said motor to remain stationary, means influenced by the temperature of said heat exchange device for controlling said switching means in a manner for maintaining said heat exchange device at constant temperature, and means including electric current controlling means actuated by a thermostat for varying the temperature of the heat exchange device maintained.

7. In an air conditioning system, in combination, a heat exchange device over which air is adapted to be passed for a conditioning action, means for causing a flow of air over said heat exchange device and into a space to be conditioned, means for supplying cooling fluid to said heat exchange device, a controller for varying the temperature of said heat exchange device, a reversible electric motor for actuating said controller, switching means operative to selectively cause movement of said motor in either direction or to cause said motor to remain stationary, means influenced by the temperature of said heat exchange device for controlling said switching means in a manner for maintaining said heat exchange device at constant temperature, and means responsive to humidity for varying the flow of air over said heat exchange device.

8. In an air conditioning system, in combination, a heat exchange device over which air is adapted to be passed for a conditioning action, means for causing a flow of air over said heat exchange device and into a space to be conditioned, means for supplying cooling fluid to said heat exchange device, a controller for varying the temperature of said heat exchange device, a reversible electric motor for actuating said controller, switching means operative to selectively cause movement of said motor in either direction or to cause said motor to remain stationary, means influenced by the temperature of said heat exchange device for controlling said switching means in a manner for maintaining said heat exchange device at constant temperature, means including electric current controlling means actuated by a thermostat for varying the temperature of the heat exchange device maintained, and means responsive to humidity for varying the flow of air over said heat exchange device.

9. In an air conditioning system, a direct expansion cooling device over which air is adapted to be passed for conditioning thereof, means for supplying refrigerant to said cooling device, means for withdrawing refrigerant therefrom, humidity control means for varying the rate of air flow across said cooling device in a manner to reduce the rate of air flow upon increase in humidity, an electro-magnetic device for controlling said withdrawing means, a first electric current controlling means connected to said electro-magnetic device, means influenced by the temperature of the cooling device for operating said first current controlling means for maintaining the cooling device at substantially constant temperature, a second electric current controlling means for determining the temperature of the cooling device maintained, and means influenced by the temperature of the space for operating said second current controlling means.

WILLIAM L. McGRATH.